(12) United States Patent
Shin

(10) Patent No.: US 7,168,130 B2
(45) Date of Patent: Jan. 30, 2007

(54) GAP ADJUSTABLE BUMPER FOR GLOVE BOX

(75) Inventor: Kwang-Seob Shin, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 147 days.

(21) Appl. No.: 11/001,011

(22) Filed: Dec. 2, 2004

(65) Prior Publication Data

US 2005/0283943 A1    Dec. 29, 2005

(30) Foreign Application Priority Data

Jun. 9, 2004    (KR) .................. 10-2004-0042081

(51) Int. Cl.
    *E05F 5/02*    (2006.01)
(52) U.S. Cl. .......................... 16/82; 16/86 R
(58) Field of Classification Search ............ 16/82,
    16/85, 86 R, 86 A, 2.1; 248/188.4, 410,
    248/411; 411/383, 384, 535, 550, 551; 180/69.21,
    180/89.17; 292/DIG. 14
    See application file for complete search history.

(56) References Cited

U.S. PATENT DOCUMENTS

| | | | |
|---|---|---|---|
| 2,813,712 A * | 11/1957 | Stanis ..................... 267/257 |
| 4,218,599 A * | 8/1980 | Garn ........................ 200/530 |
| 4,519,974 A * | 5/1985 | Bravenec et al. ........... 264/279 |
| 4,757,447 A * | 7/1988 | Woffinden .................. 711/207 |
| 5,092,550 A * | 3/1992 | Bettini ..................... 248/188.4 |
| 5,735,511 A * | 4/1998 | Stocker et al. ......... 267/140.13 |
| 5,895,089 A * | 4/1999 | Singh et al. ................ 296/207 |
| 6,088,878 A * | 7/2000 | Antonucci et al. .......... 16/86 A |
| 6,507,976 B2 * | 1/2003 | Ichimaru ..................... 16/82 |
| 6,749,242 B2 | 6/2004 | Park |

FOREIGN PATENT DOCUMENTS

| DE | 4340114 A1 * | 6/1995 |
| DE | 29716111 U1 * | 11/1997 |
| JP | 2004293068 A * | 10/2004 |
| KR | 1998-011457 | 5/1998 |
| KR | 1997-61752 | 12/1998 |

OTHER PUBLICATIONS

U.S. Appl. No. 10/744,006 to Kim.
U.S. Appl. No. 10/743,762 to Cho.
U.S. Appl. No. 10/810,822 to Kim.
U.S. Appl. No. 10/810,826 to Kim.
U.S. Appl. No. 11/024,414 to Shin.

* cited by examiner

*Primary Examiner*—Chuck Y. Mah
(74) *Attorney, Agent, or Firm*—Greenblum & Bernstein, P.L.C.

(57) ABSTRACT

A bumper for absorbing impact when a glove box is opened/closed. The bumper is screwed on a crash pad so as to adjust a protruded degree, thereby being capable of easily regulating a T coordinate when a gap problem occurs.

5 Claims, 3 Drawing Sheets

GAP ADJUSTABLE BUMPER FOR GLOVE BOX

RELATED APPLICATIONS

The present disclosure relates to subject matter contained in priority Korean Application No. 10-2004-0042081, filed on Jun. 9, 2004, which is herein expressly incorporated by reference in its entirety.

BACKGROUND OF THE INVENTION

1. Field of the Invention

The present invention relates to a bumper for a glove box, and more particularly to a gap adjustable bumper for a glove box capable of regulating a T coordinate by a threaded connection.

2. Description of the Related Art

In general, automobiles are equipped with various handy devices for accommodating a driver and passengers in an indoor space thereof. Among the handy devices, a glove box is installed to a crash pad in front of a passenger seat. The glove box is opened/closed by rotating about a hinge disposed on a lower end thereof. Here, in order to efficiently absorb impact as well as to prevent a noise when the glove box is closed, a bumper is used at a place where the glove box brought into contact into the crash pad.

In current automobiles, emotional qualities such as internal decoration etc. including traveling performance, safety and appearance serve as important factors on estimating the automobile. Therefore, appearance of the crash pad inclusive of the glove box serves as one of the important factors on estimating the emotional qualities. For this reason, a problem on a gap of the glove box serves as a fatal defect on estimating the automobile.

Conventional bumpers are disclosed in Korean Utility Model Publication Nos. 1997-61752 and 1998-011457. For example, as in FIG. 1, a conventional bumper formed integrally is attached to a crash pad.

Accordingly, when a gap problem is caused by the glove box, the T coordinate is not regulated in a simple manner. As a result, there are many difficulties in improving the emotional qualities.

SUMMARY OF THE INVENTION

Therefore, the present invention is to solve the foregoing problems and/or disadvantages and to provide at least the advantages described hereinafter. Accordingly, the present invention is to easily regulate a T coordinate when a gap problem occurs by fastening a resilient part of the bumper through a thread.

In order to accomplish this objective, according to an aspect of the invention, there is provided a gap adjustable bumper for a glove box. The gap adjustable bumper comprises a connection mounted in a mounting hole of a crash pad, and a cushion screwed to the connection through a thread. Preferably, the cushion includes a retainer formed with a thread at a center thereof, and a resilient cap surrounding the retainer.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1:
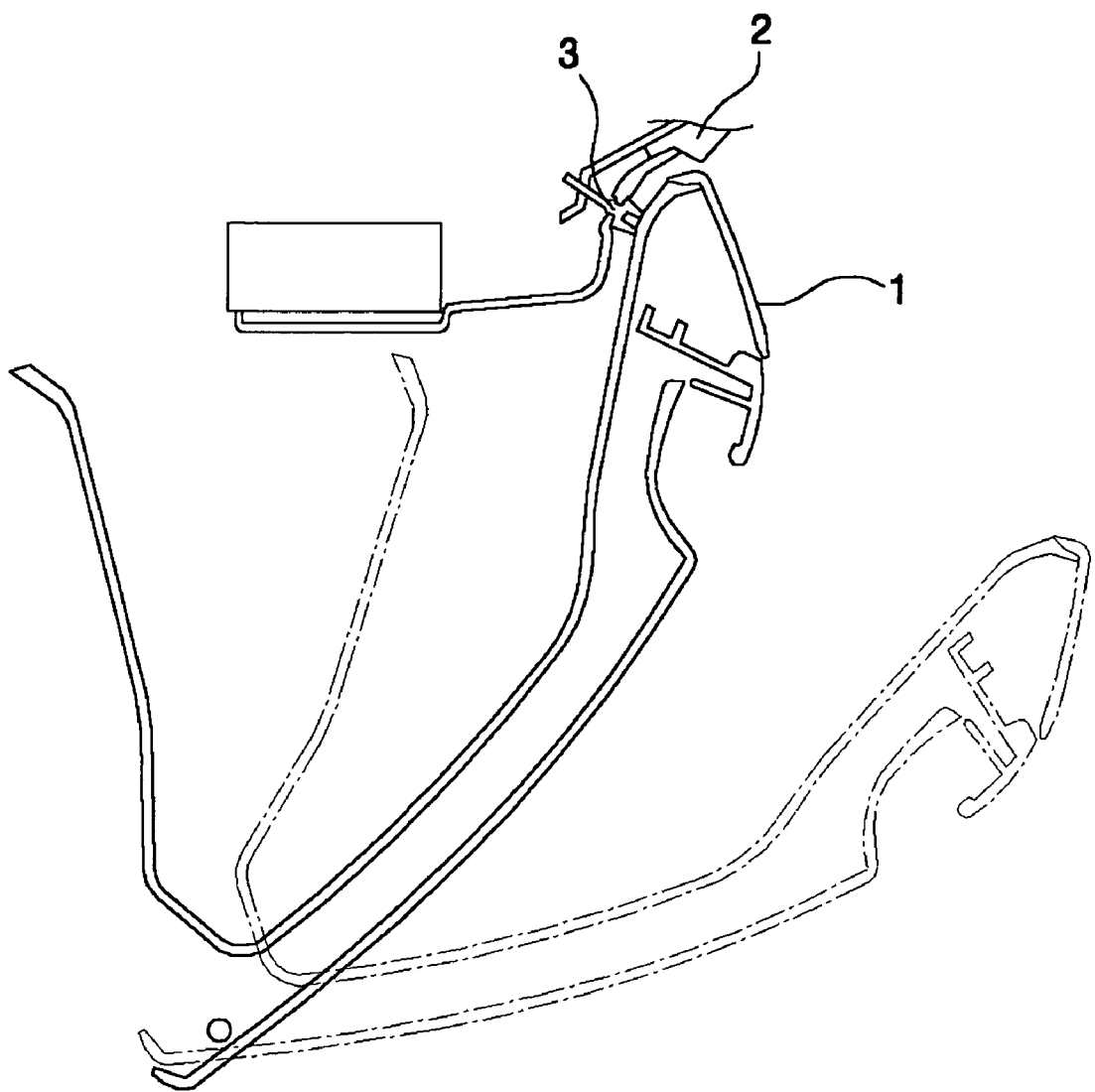
FIG. 1 is a cross-sectional view of a glove box to which a conventional bumper is employed.
Figure 2:
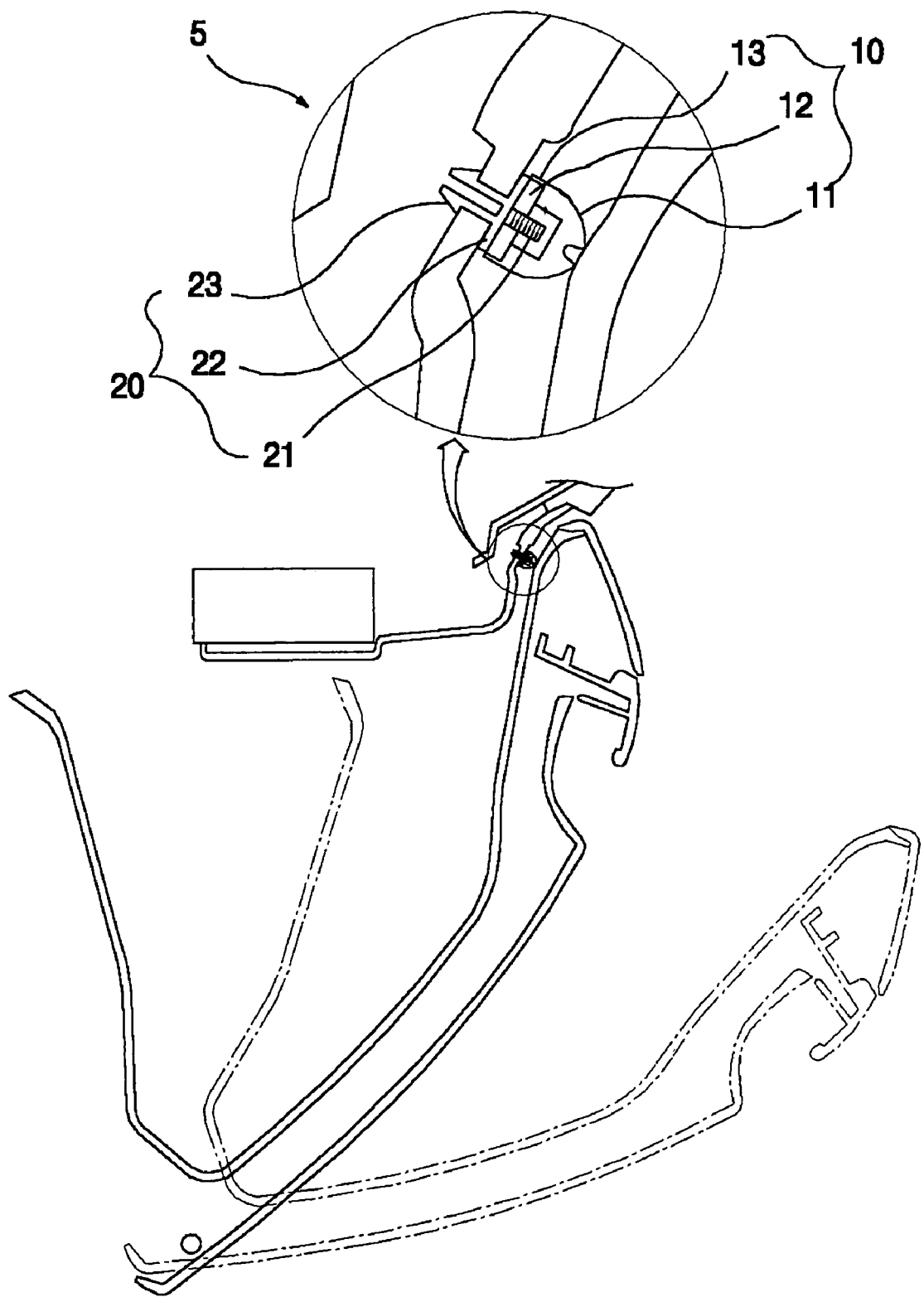
FIG. 2 is a cross-sectional view of a glove box to which a bumper of the present invention is employed.

Hereinafter, a detailed description will be made about a developing apparatus and image forming equipment having the same according to exemplary embodiments of the invention with reference to the accompanying drawings.

A glove box is provided in front of a passenger seat. The glove box is opened/closed about a hinge of a lower end thereof and comes into contact with a crash pad 2 on an upper end thereof. The crash pad 2 is provided with a mounting hole at a place where it comes into contact with the glove box. The mounting hole is coupled with a connection 20 of the bumper. The bumper 5 is composed of a cushion 10 for absorbing impact, and the connection 20 for coupling the cushion 10 to the crash pad 2.

The connection 20 of the bumper includes a hook 23 inserted into a panel of the crash pad 2, a threaded part 21 screwed with the cushion 10, a flange 22 disposed between the hook 23 and the threaded part 21.

The hook 23 passes through the panel of the crash pad 2 to fix the connection 20 to the crash pad 2. The flange 22 comes into contact with an outer surface of the crash pad 2.

The cushion of the bumper 5 includes a retainer 12 having a thread therein so as to be screwed with the threaded part 21, and a resilient cap 11 surrounding an outer circumferential surface of the retainer and capable of absorbing impact. The cushion 10 may be formed in a manner that the retainer 12 and the resilient cap 11 are integrated, or that the retainer 12 is coupled into a separate recess which is formed in the resilient cap 11 so as to be coupled with the retainer 12. In either case, the resilient cap 11 is formed of a material having elasticity such as a rubber. Hence, the retainer 12 is preferably formed of another material such as nylon so as to have a strong fastening force when being threaded and screwed.

The resilient cap 11 is configured to surround an outer circumferential surface of the connection 20 on an end thereof when being coupled with the connection 20. To this end, the resilient cap 11 preferably includes a resilient ring 13 which is integrally formed on the end thereof.

Figure 3:
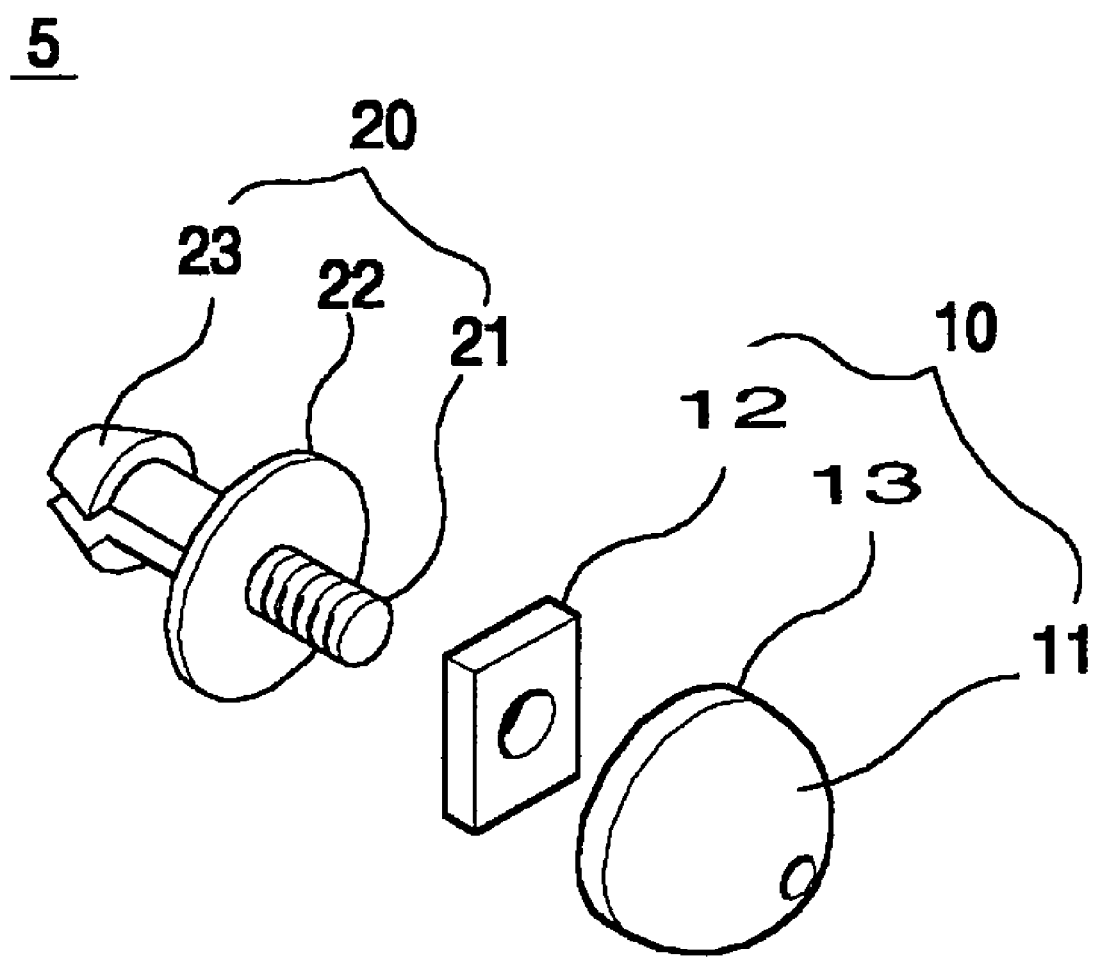
FIG. 3 is an exploded perspective view of a bumper.

As in FIG. 3, as to a state where the bumper 5 is coupled to the crash pad 2, the connection 20 is configured so that the hook 23 passes through the panel of the crash pad 2 to be fastened to the crash pad 2. Here, the flange 22 and the threaded part 21 are exposed outward. The threaded part 12 is screwed with the cushion 10 in which the retainer 12 is coupled with the resilient cap 11. When screwed, the resilient ring 13 on an end of the cushion 10 is elastically transformed, thus surrounding the flange 22 of the connection 20.

When a gap problem occurs at the bumper 5 coupled in this structure, the glove box is opened. Then, the screwed cushion 10 is rotated, so that it is possible to adjust a protruded state of the bumper. Consequently, it is possible to regulate the T coordinate.

The foregoing effects according to the present invention can be summarized as follows.

First, when the gap problem occurs, it is possible to easily regulate the T coordinate using the threaded bumper.

Second, because it is possible to easily regulate the T coordinate using the thread, it is not required to correct a die off and on. Thus, it is possible to remarkably save costs.

Third, the cushion is screwed with the connection through the retainer in the retainer, so that it is possible to obtain a cushion effect using the resilient cap, and simultaneously to obtain a strong fastening force through the retainer.

Fourth, the resilient ring formed the end of the resilient cap surrounds the flange of the connection, so that it is possible to endow a stronger fastening force between the connection and the cushion.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A gap adjustable bumper for a glove box, comprising:
   a connection mountable in a mounting hole of a crash pad; and
   a cushion screwed to the connection through a thread,
   wherein the connection comprises a hook fastenable to the crash pad, a threaded part screwed with the cushion, and a flange provided between the hook and the threaded part, and
   wherein the cushion is configured to absorb impact that occurs when the glove box is closed and to provide a cushion effect for the clove box.

2. The gap adjustable bumper as claimed in claim 1, wherein the cushion includes a retainer formed with a thread at a center thereof, and a resilient cap surrounding the retainer.

3. The gap adjustable bumper as claimed in claim 2, wherein the cushion is provided with a resilient ring which is integrally formed at an end thereof so that the end of the cushion surrounds an outer circumferential surface of the connection when the cushion is coupled with the connection.

4. The gap adjustable bumper as claimed in claim 2, wherein the resilient cap is formed of a rubber, and the retainer is formed of a nylon.

5. The gap adjustable bumper as claimed in claim 1, wherein the cushion is provided with a resilient ring which is integrally formed at an end thereof so that the end of the cushion surrounds an outer circumferential surface of the connection when the cushion is coupled with the connection.

* * * * *

UNITED STATES PATENT AND TRADEMARK OFFICE
CERTIFICATE OF CORRECTION

PATENT NO. : 7,168,130 B2 Page 1 of 1
APPLICATION NO. : 11/001011
DATED : January 30, 2007
INVENTOR(S) : K. S. Shin It is certified that error appears in the above-identified patent and that said Letters Patent is hereby corrected as shown below:

At column 4, line 3 (claim 1, line 11), "clove" should be --glove--.

Signed and Sealed this

Eighth Day of April, 2008

JON W. DUDAS
*Director of the United States Patent and Trademark Office*